United States Patent
Chu Ke et al.

(10) Patent No.: US 7,771,098 B2
(45) Date of Patent: Aug. 10, 2010

(54) MULTI-PRIMARY COLOR DISPLAY

(75) Inventors: Hui Chu Ke, Hsin-Chu (TW); Chih-Cheng Chan, Hsin-Chu (TW); Guo-Feng Uei, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 194 days.

(21) Appl. No.: 11/963,917

(22) Filed: Dec. 24, 2007

(65) Prior Publication Data

US 2009/0086133 A1  Apr. 2, 2009

(30) Foreign Application Priority Data

Sep. 28, 2007  (TW) .............................. 96136407 A

(51) Int. Cl.
*G02F 1/00* (2006.01)
(52) U.S. Cl. ...................................... 362/561; 362/583
(58) Field of Classification Search ................ 362/583, 362/561; 345/694; 349/106, 409
See application file for complete search history.

(56) References Cited

U.S. PATENT DOCUMENTS

| 7,006,172 | B2 | 2/2006 | Kawana et al. |
| 7,268,748 | B2 * | 9/2007 | Brown Elliott ............... 345/22 |
| 7,545,468 | B2 * | 6/2009 | Aoki .......................... 349/114 |
| 7,573,493 | B2 * | 8/2009 | Brown Elliott et al. ...... 345/690 |
| 2006/0132679 | A1 | 6/2006 | Sui et al. |
| 2009/0141381 | A1 * | 6/2009 | Itou et al. ................... 359/891 |

FOREIGN PATENT DOCUMENTS

| CN | 1716034 | 1/2006 |
| CN | 1725274 | 1/2006 |
| CN | 101006484 | 7/2007 |
| JP | 2006-215234 | 8/2006 |
| JP | 2007-140408 | 6/2007 |
| JP | 2007-226084 | 9/2007 |
| TW | 200521955 | 7/2005 |
| TW | 200643890 | 12/2006 |

OTHER PUBLICATIONS

English language translation of abstract of TW 200521955 (published Jul. 1, 2005).
English language translation of abstract of CN 1716034 (published Jan. 4, 2006).

(Continued)

*Primary Examiner*—Stephen F Husar
*Assistant Examiner*—Peggy A. Neils
(74) *Attorney, Agent, or Firm*—Thomas, Kayden, Horstemeyer & Risley

(57) ABSTRACT

A multi-primary color display has a backlight source and pixels. Each pixel has at least four sub pixels, which display red primary color, green primary color, blue primary color and a fourth primary color, respectively. At the peak position of the fourth primary color located in the wavelength range between 550 nm~600 nm, the relative luminance ratio of the fourth primary color to the green primary color is greater than or equal to 0.5. When the ratio of the relative luminance meets the requirement and the relative luminance of a newly added primary color is greater than a certain value, the colors beyond the three-primary color gamut, which includes natural colors and other colors outside the natural color gamut, can be reproduced.

16 Claims, 16 Drawing Sheets

OTHER PUBLICATIONS

English language translation of abstract of CN 1725274 (published Jan. 25, 2006).
English language translation of abstract of JP 2006-215234 (published Aug. 17, 2006).
English language translation of abstract of TW 200643890 (published Dec. 16, 2006).
English language translation of abstract of JP 2007-140408 (published Jun. 7, 2007).
English language translation of abstract of CN 101006484 (published Jul. 25, 2007).
English language translation of abstract of JP 2007-226084 (published Sep. 6, 2007).

* cited by examiner

MULTI-PRIMARY COLOR DISPLAY

RELATED APPLICATIONS

This application claims priority to Taiwan Application Serial Number 96136407, filed Sep. 28, 2007, which is herein incorporated by reference.

BACKGROUND OF THE INVENTION

1. Field of Invention

The invention relates to a display device and, in particular, to a multi-primary color display.

2. Related Art

With advances in modern technologies, people have higher demands for the colors of display devices, hoping that they can provide more ample and saturated colors. Usual displays only use three primary colors (e.g., red, green, and blue primary colors). However, such three-primary color displays cannot thoroughly present all colors existing in nature, particularly sky blue and gold colors. In the prior art, a solution is to increase the saturation of the above-mentioned three primary colors, thereby enlarging the color gamut. However, this method has its limitations. Moreover, it has the disadvantage of a lower brightness due to the properties of the display. Another solution is to include a new primary color different from the red, green, and blue primary colors in the conventional three-primary color displays. This newly added primary color falls outside the triangular color gamut enclosed by the red, green, and blue primary colors on the CIE1931 chromatic diagram. Therefore, it can effectively increase the color gamut of the display, as well as keep or even enhance the brightness thereof.

SUMMARY OF THE INVENTION

An objective of the invention is to provide a display device with a wider color gamut and more possible colors in nature.

In an embodiment of the invention, the display device includes a backlight source and pixels. Each pixel has at least four sub pixels displayed, respectively, red primary color, green primary color, blue primary color, and a fourth primary color. At the peak position of the fourth primary color located in the wavelength range between 550 nm~600 nm, the relative luminance ratio of the fourth primary color to the red primary color is greater than or equal to 1.

In another embodiment of the invention, the display device includes a backlight source and pixels. Each pixel has at least four sub pixels including red primary color, green primary color, blue primary color, and a fourth primary color. The peak position of the fourth primary color is located in the wavelength range between 550 nm~600 nm and the relative luminance ratio of the fourth primary color to the green primary color is greater than or equal to 0.5.

In a further embodiment of the invention, the display device includes a backlight source and pixels. Each pixel has at least four sub pixels including red primary color, green primary color, blue primary color, and a fourth primary color. In the wavelength range between 550 nm~600 nm the ratio of the total relative luminances of the fourth primary color and the red primary color is greater than or equal to 2.

In yet another embodiment of the invention, the display device includes a backlight source and pixels. Each pixel has at least four sub pixels including red primary color, green primary color, blue primary color, and a fourth primary color. In the wavelength range of 550~600 nm, the ratio of the total relative luminances of the fourth primary color and the green primary color is greater than or equal to 0.5.

In yet another embodiment of the invention, the display device includes a backlight source and pixels. Each pixel has at least four sub pixels including red primary color, green primary color, blue primary color, and a fourth primary color. Suppose the backlight maximum of the backlight source is normalized to one, and the filter spectrum of the sub pixels of the fourth primary color is also normalized to one. The average relative luminance of the fourth primary color located in the wavelength range of 550 nm~600 nm is greater than or equal to 0.03.

In yet another embodiment of the invention, the display device includes a backlight source and pixels. Each pixel has at least four sub pixels including red primary color, green primary color, blue primary color, and a fourth primary color. In the wavelength range of 450 nm~500 nm, the ratio of the total relative luminances of the fourth primary color and the green primary color is smaller than or equal to 10.

In yet another embodiment of the invention, the display device includes a backlight source and pixels. Each pixel has at least four sub pixels including red primary color, green primary color, blue primary color, and a fourth primary color. In the wavelength range between 450 nm~500 nm, the ratio of the total relative luminances of the fourth primary color and the blue primary color is smaller than or equal to 10.

In yet another embodiment of the invention, the display device includes a backlight source and pixels. Each pixel has at least four sub pixels including red primary color, green primary color, blue primary color, and a fourth primary color. Suppose the backlight maximum of the backlight source is normalized to one, and the filter spectrum of the sub pixels of the fourth primary color is also normalized to one. The average relative luminance of the fourth primary color located in the wavelength range of 450 nm-500 nm is smaller than or equal to 10.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

The invention discloses the relation among the relative luminance (i.e., backlight intensity×transmittance) of the primary colors in a multi-primary color display. At an appropriate proportion of relative luminance or when the relative luminance of the newly added primary color is greater than a specific value, colors beyond the color gamut of the original three primary colors (including natural colors and those beyond the natural color gamut) can be produced.

An embodiment of the invention uses a simulation method to simulate and observe spectral variations in the relative luminance produced by the four different backlight sources and several sets of color filters, as the color gamut thus formed increases its range.

Figure 1:
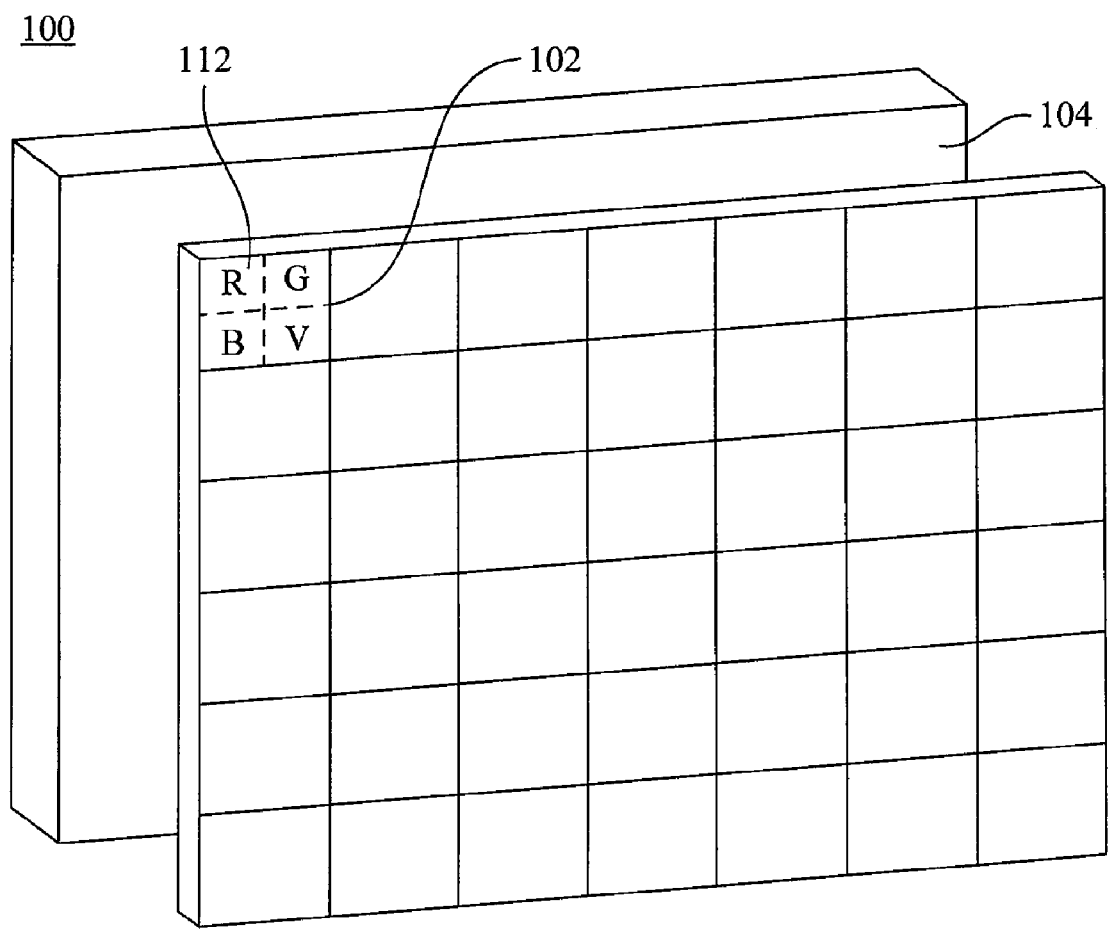
FIG. 1 is a schematic view of a display device according to an embodiment of the invention.

FIG. 1 is a schematic view of the display device in an embodiment of the invention. The display device 100 has a backlight source 104 and pixels 102. Each pixel 102 has at least four sub pixels 112 that displays red primary color (R), green primary color (G), blue primary color (B), and a fourth primary color (V), respectively. For example, the display device 100 can be a flat panel display, such as a liquid crystal display (LCD). Each sub pixel 112 has a distinct color filter for displaying a specific color from the light emitted by the backlight source 104.

Figure 2:
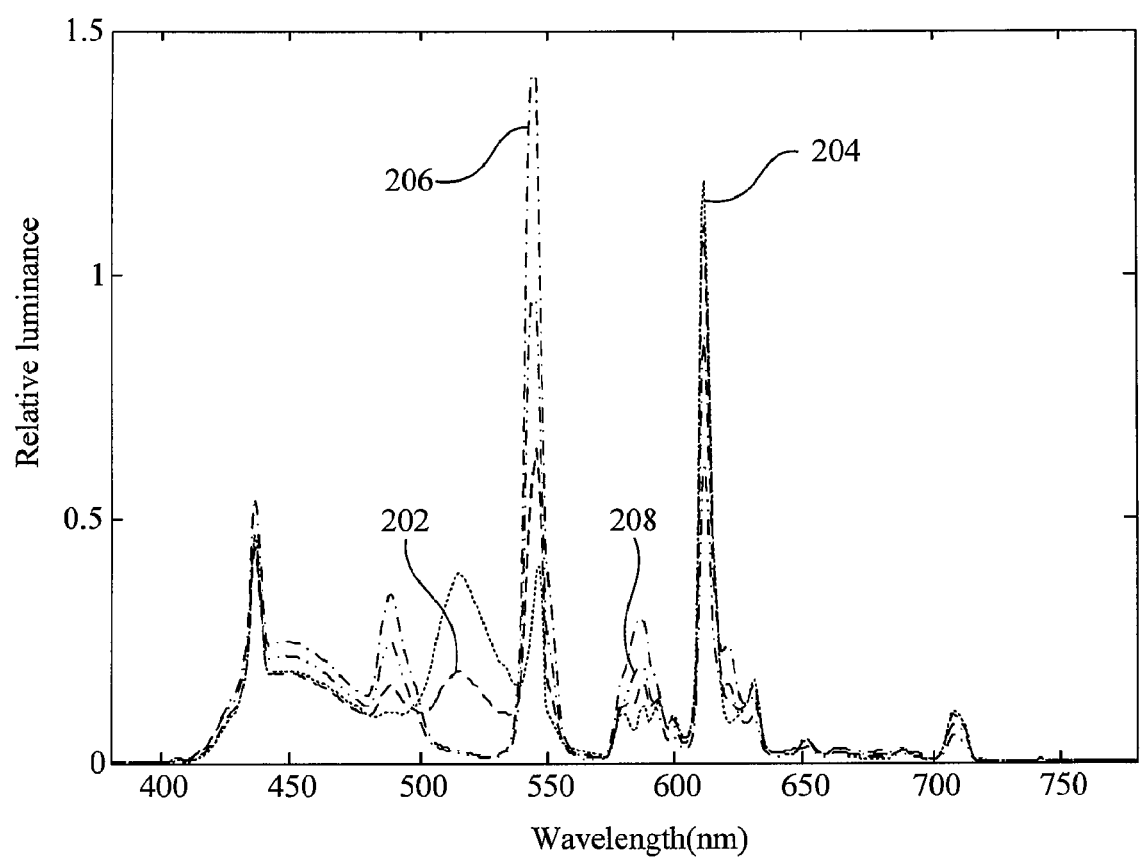
FIG. 2 shows the spectra of the four backlight sources used for simulations in the disclosed embodiments.
Figure 3A:
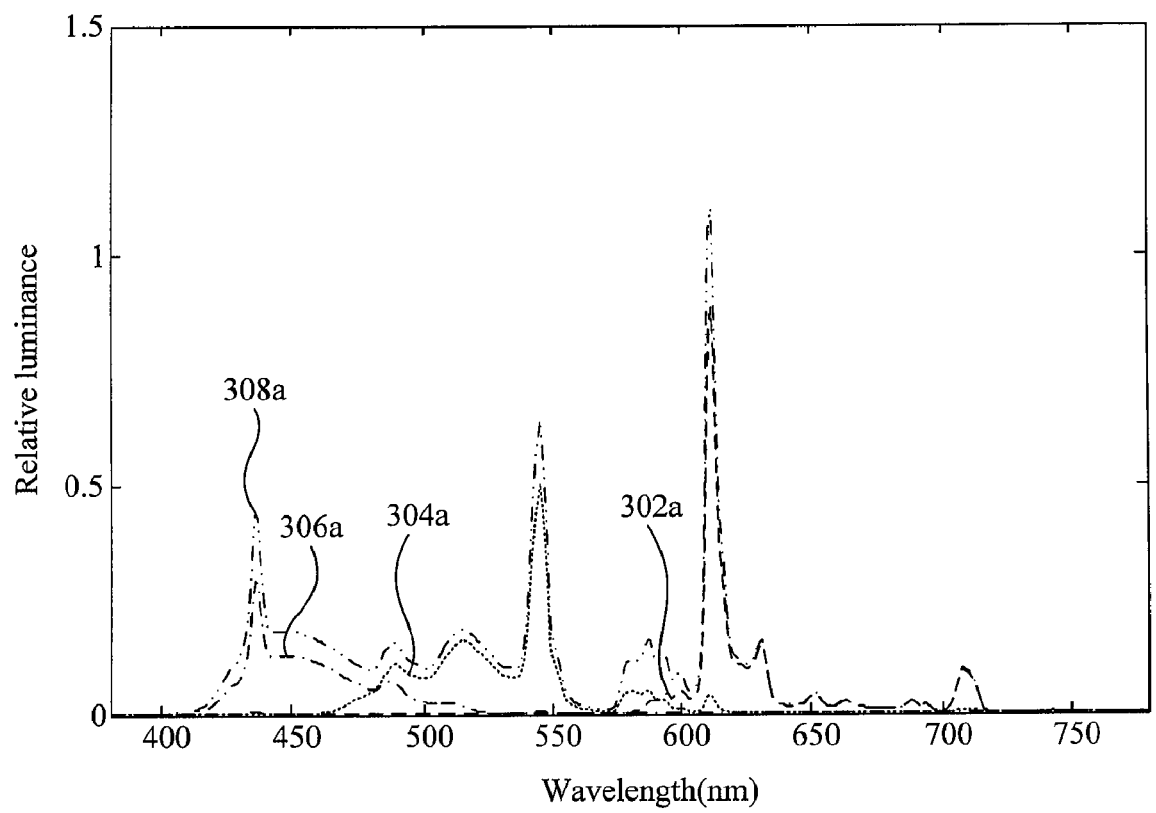
FIGS. 3A-3D show the relative luminance spectra of the first, second, third, and fourth backlight sources in combination with the red, green, and blue primary color filters according to the invention for obtaining larger color gamut.
Figure 3B:
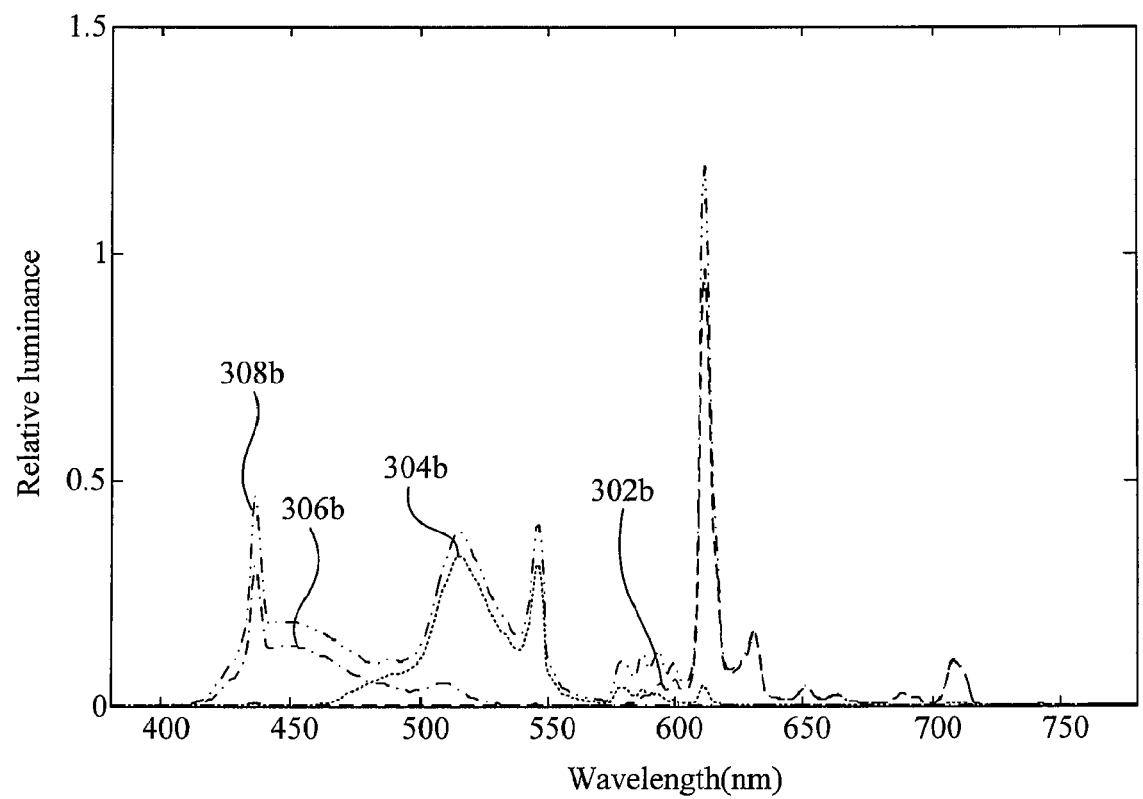
Figure 3C:
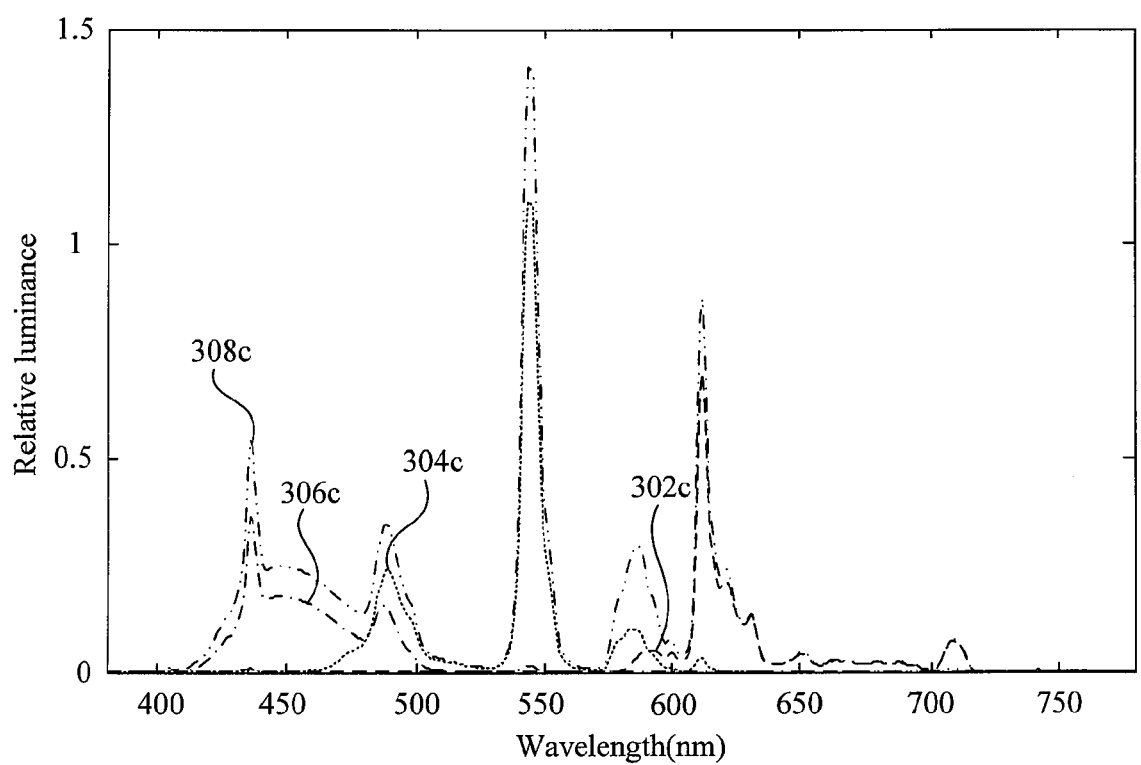
Figure 3D:
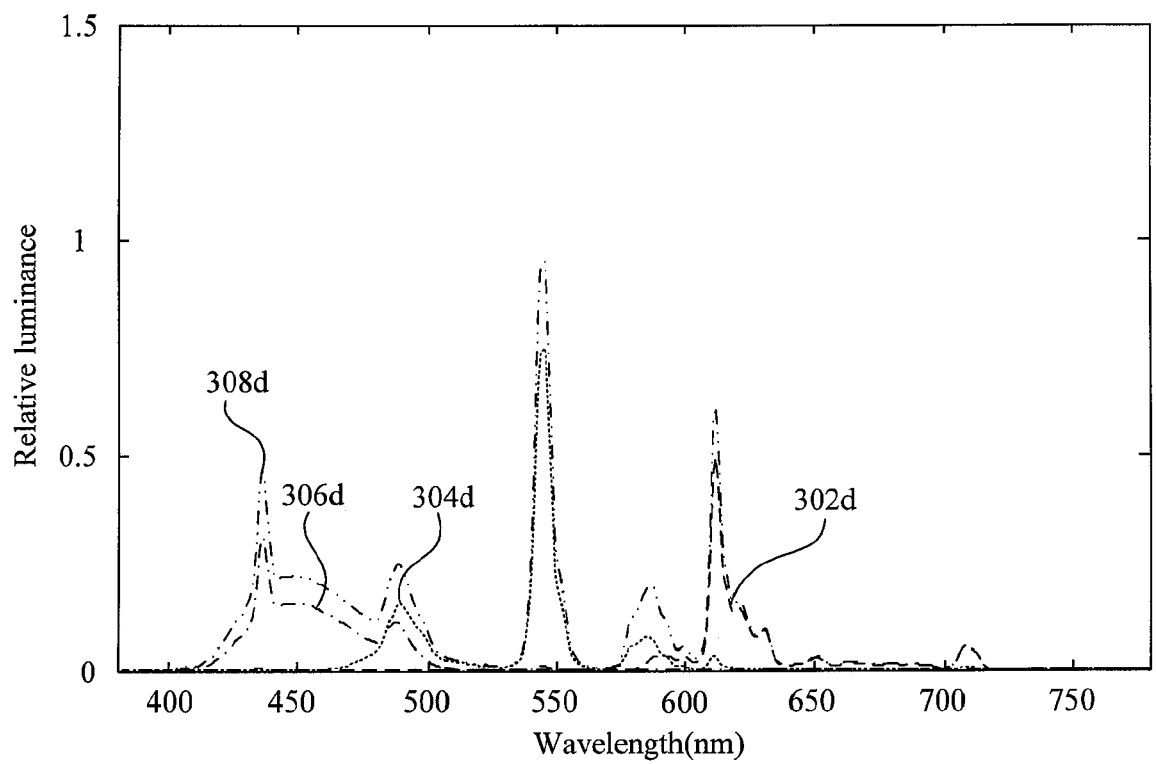
Figure 4A:
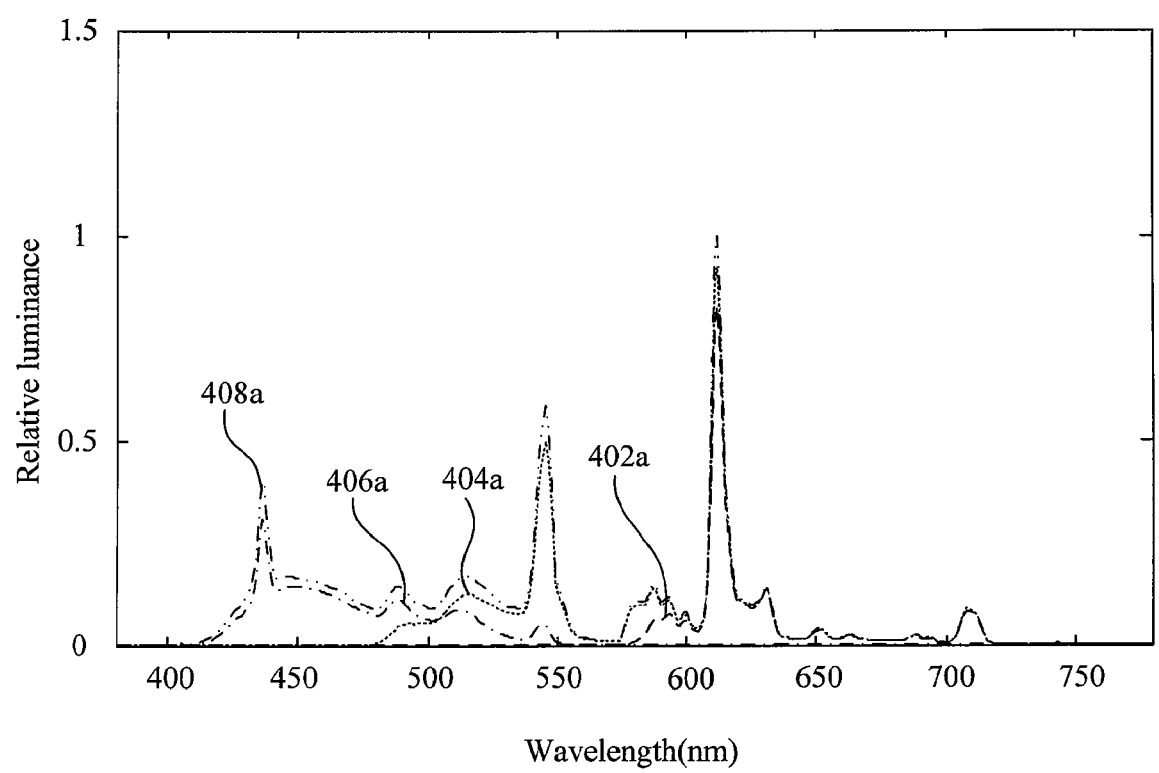
FIGS. 4A-4D show the relative luminance spectra of the first, second, third, and fourth backlight sources in combination with the red, green, and blue primary color filters according to the invention for obtaining smaller color gamut.
Figure 4B:
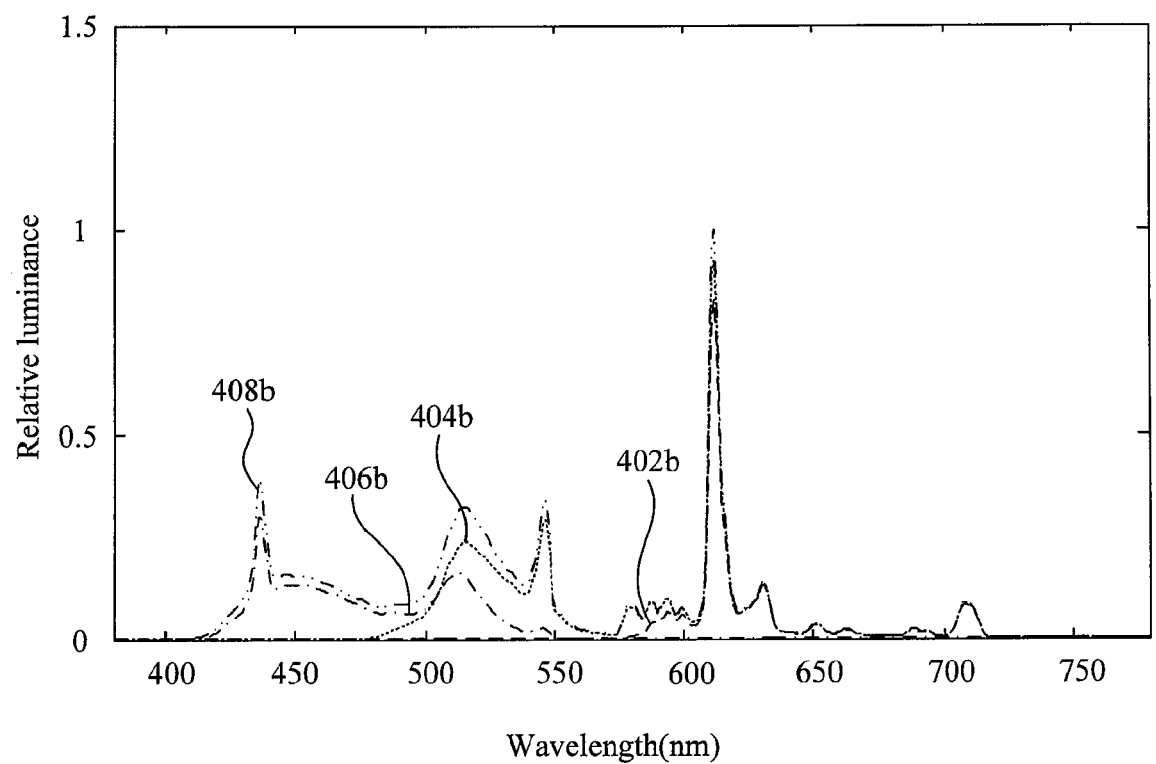
Figure 4C:
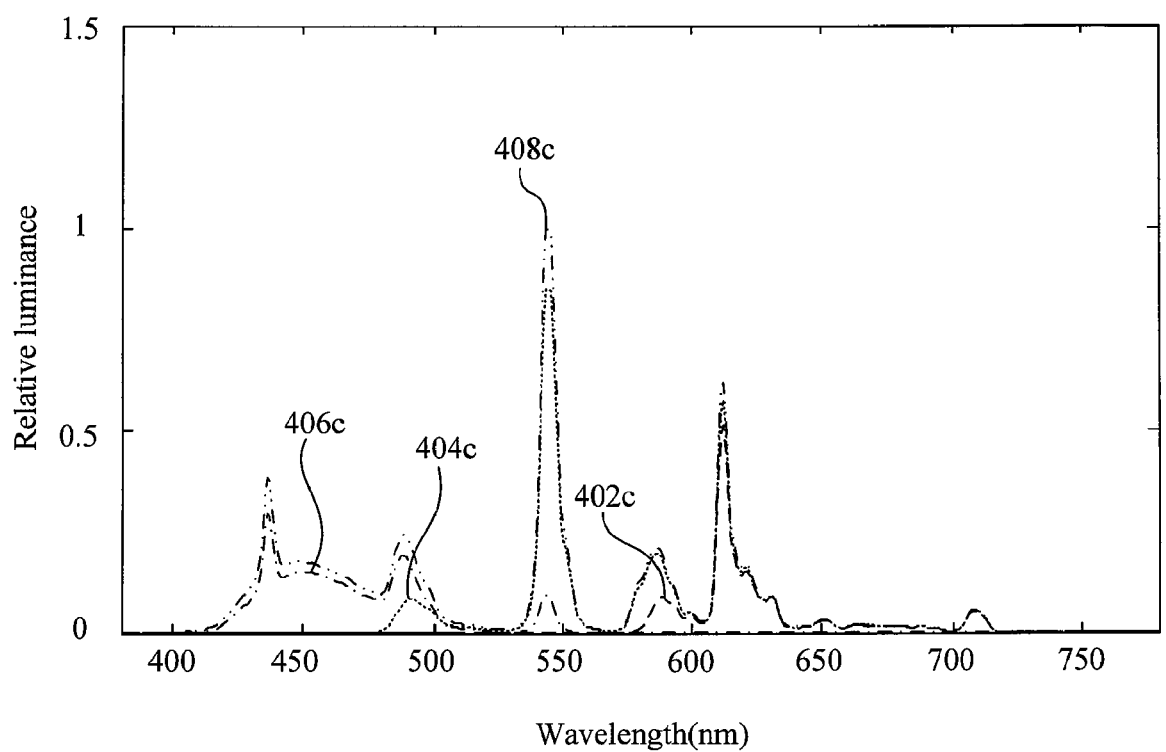
Figure 4D:
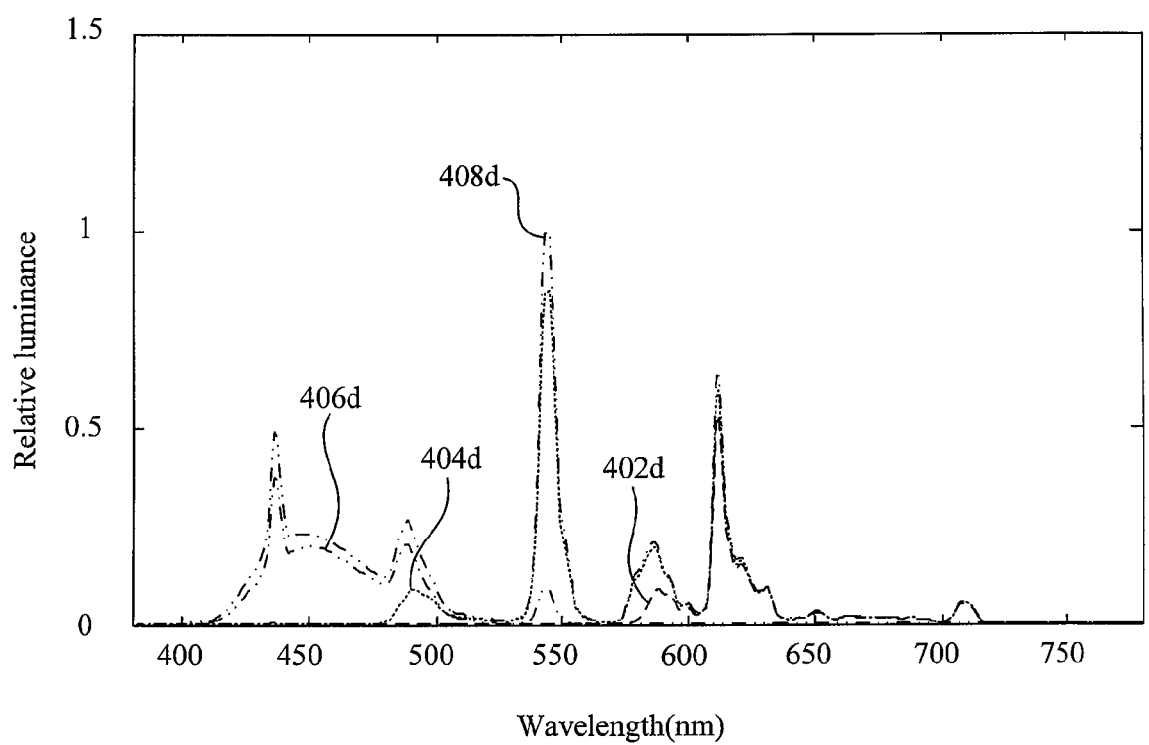

FIG. 2 shows four backlight spectra used in the simulation of the disclosed embodiment. The vertical axis labels the relative luminance, and the horizontal axis labels the wavelength in units of rm. As shown in the drawing, the spectra 202, 204, 206, and 208 of the first, second, third, and fourth backlight sources, respectively, have their specific relative luminance distributions in different wavelength ranges. Therefore, they can combine with different sets of color filters to produce more colors in the simulations. FIGS. 3A-3D show the relative luminance spectra when the first, second, third, and fourth backlight sources, are combined respectively with the red, green, and blue primary color filters to render larger color gamut. The vertical axis labels the relative luminance, and the horizontal axis labels the wavelength in units of nm. In FIGS. 3A-3D, the spectra 302a-302d represent respectively the relative luminances in different wavelengths after each backlight source is combined with the red color filter. The spectra 304a-304d represent respectively the relative luminances in different wavelengths after each backlight source is combined with the green color filter. The spectra 306a-306d represent respectively the relative luminances in different wavelengths after each backlight source is combined with the blue color filter. The spectra 308a-308d represent respectively the relative luminances of the light emitted by the backlight source in different wavelengths.

FIGS. 4A-4D show the relative luminance spectra when the first, second, third, and fourth backlight sources, are combined respectively with the red, green, and blue primary color filters to render smaller color gamut. The vertical axis labels the relative luminance, and the horizontal axis labels the wavelength in units of nm. In FIGS. 4A-4D, the spectra 402a-402d represent respectively the relative luminances in different wavelengths after each backlight source is combined with the red color filter. The spectra 404a-404d represent respectively the relative luminances in different wavelengths after each backlight source is combined with the green color filter. The spectra 406a-406d represent respectively the relative luminances in different wavelengths after each backlight source is combined with the blue color filter. The spectra 408a-408d represent respectively the relative luminances of the light emitted by the backlight source in different wavelengths.

Afterwards, in the two sets of three-primary color filters for the above-mentioned larger color gamut and smaller color gamut, a different yellow or cyan primary color filter is added to obtain multiple sets of four primary color filters for simulations with four different backlight sources. Table 1 and Table 2 show the chromatic coordinates (x,y) of the yellow primary color or cyan primary color in the CIE1931 chromatic diagram when the four backlight sources are combined with the yellow primary color filter or the cyan primary color filter.

TABLE 1

Chromatic coordinates of the yellow primary color for different backlight sources.

| First backlight source | | Second backlight source | | Third backlight source | | Fourth backlight source | |
| --- | --- | --- | --- | --- | --- | --- | --- |
| x | y | x | y | x | y | x | y |
| 0.4731 | 0.4949 | 0.4454 | 0.5128 | 0.4517 | 0.5196 | 0.4517 | 0.5174 |
| 0.4833 | 0.4925 | 0.4598 | 0.5071 | 0.4584 | 0.5215 | 0.4590 | 0.5194 |
| 0.4910 | 0.4902 | 0.4715 | 0.5017 | 0.4627 | 0.5226 | 0.4637 | 0.5205 |

TABLE 1-continued

Chromatic coordinates of the yellow primary color for different backlight sources.

| First backlight source | | Second backlight source | | Third backlight source | | Fourth backlight source | |
|---|---|---|---|---|---|---|---|
| x | y | x | y | x | y | x | y |
| 0.4970 | 0.4879 | 0.4810 | 0.4968 | 0.4656 | 0.5231 | 0.4668 | 0.5210 |
| 0.5016 | 0.4858 | 0.4888 | 0.4923 | 0.4675 | 0.5233 | 0.4689 | 0.5213 |
| 0.5053 | 0.4838 | 0.4955 | 0.4883 | 0.4688 | 0.5233 | 0.4704 | 0.5213 |
| 0.5084 | 0.4821 | 0.5011 | 0.4846 | 0.4697 | 0.5233 | 0.4714 | 0.5212 |
| 0.5110 | 0.4805 | 0.5059 | 0.4813 | 0.4704 | 0.5232 | 0.4722 | 0.5211 |
| 0.5132 | 0.4790 | 0.5102 | 0.4783 | 0.4710 | 0.5230 | 0.4728 | 0.5209 |
| 0.5151 | 0.4777 | 0.5139 | 0.4756 | 0.4714 | 0.5228 | 0.4732 | 0.5208 |

TABLE 2

Chromatic coordinates of the cyan primary color for different backlight sources.

| First backlight source | | Second backlight source | | Third backlight source | | Fourth backlight source | |
|---|---|---|---|---|---|---|---|
| x | y | x | y | x | y | x | y |
| 0.1557 | 0.2376 | 0.1429 | 0.2809 | 0.1697 | 0.2186 | 0.1658 | 0.1880 |
| 0.1572 | 0.2646 | 0.1427 | 0.3092 | 0.1732 | 0.2453 | 0.1687 | 0.2124 |
| 0.1592 | 0.2927 | 0.1429 | 0.3382 | 0.1774 | 0.2734 | 0.1722 | 0.2384 |
| 0.1618 | 0.3215 | 0.1437 | 0.3673 | 0.1822 | 0.3024 | 0.1763 | 0.2659 |
| 0.1650 | 0.3506 | 0.1449 | 0.3962 | 0.1876 | 0.3319 | 0.1812 | 0.2944 |
| 0.1690 | 0.3795 | 0.1468 | 0.4243 | 0.1937 | 0.3613 | 0.1868 | 0.3235 |
| 0.1736 | 0.4077 | 0.1493 | 0.4514 | 0.2005 | 0.3901 | 0.1932 | 0.3527 |
| 0.1791 | 0.4348 | 0.1526 | 0.4771 | 0.2079 | 0.4179 | 0.2002 | 0.3814 |
| 0.1853 | 0.4604 | 0.1565 | 0.5011 | 0.2158 | 0.4442 | 0.2079 | 0.4091 |
| 0.1923 | 0.4841 | 0.1613 | 0.5231 | 0.2243 | 0.4685 | 0.2163 | 0.4355 |

The following two embodiments explain how to define the relative luminance of the newly added primary color (e.g., yellow or cyan primary color) by observing several experimental examples using the above-mentioned simulation process. The relative luminance relation between red, green primary colors and the yellow primary color in the wavelength range between 550 nm~600 nm and the relative luminance relation between green, blue primary colors and the cyan primary color in the wavelength range between 450 nm~500 nm can effectively produce colors outside the gamut of the three primary colors.

First Embodiment

Figure 5A:
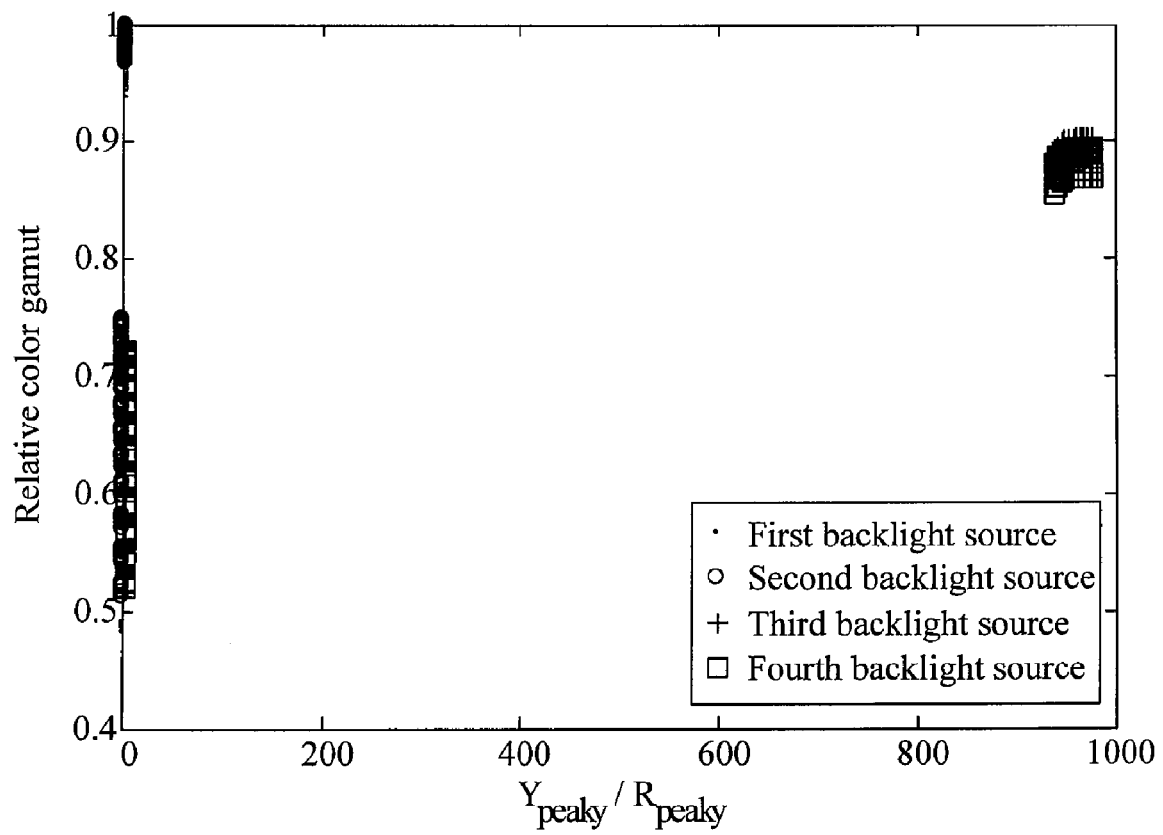
FIG. 5A shows the relative color gamut and the relative luminance ratio of the yellow primary color to the red primary color obtained from several experiments in the first embodiment.

FIG. 5A shows the relative color gamut and the ratio of the relative luminance of the yellow primary color to the red primary color according to several experimental results in the first embodiment. The little circle, hollow circle, cross, and hollow square represent the results of using the first backlight source, the second backlight source, the third backlight source, and the fourth backlight source in combination with different sets of four-primary color filters, respectively. The relative luminance ratio of the yellow primary color to the red primary color is taken at the peak position of the yellow primary color in the wavelength between 550 nm~600 nm. As shown in FIG. 5A, a wider color gamut is obtained when the ratio is greater than or equal to 1.

Figure 5B:
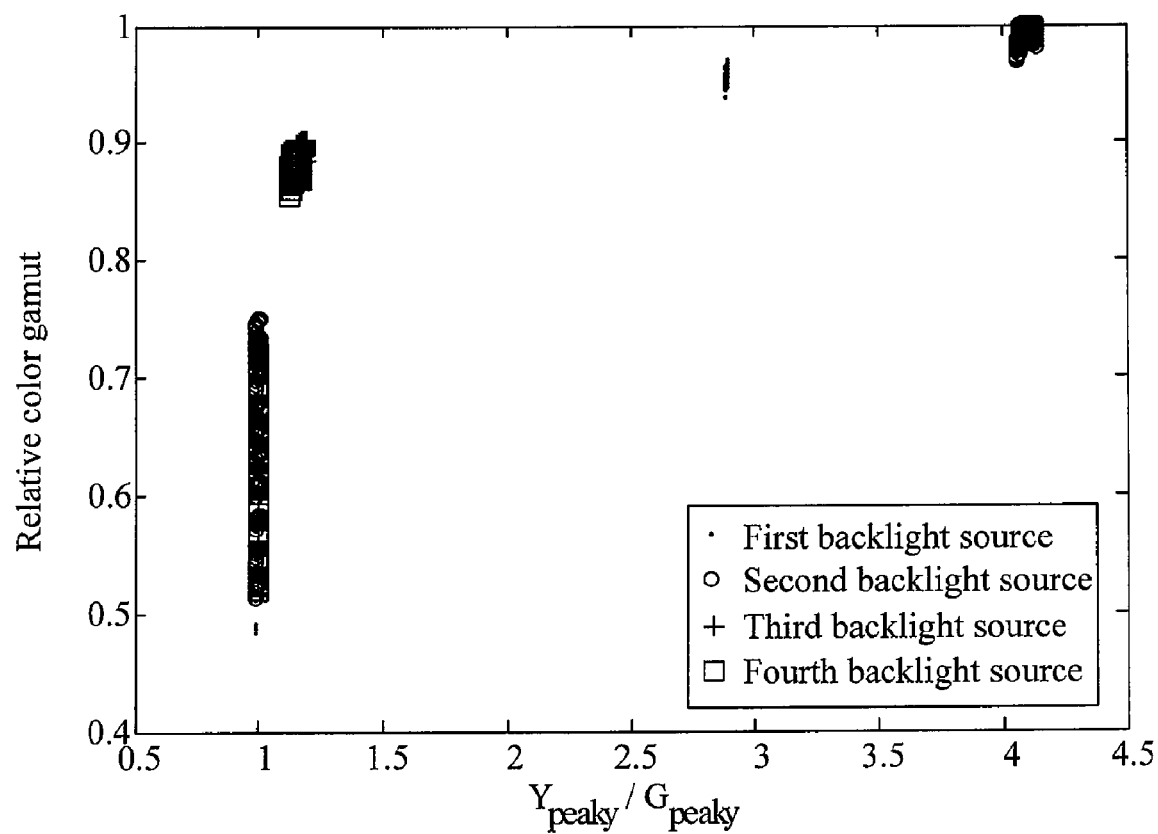
FIG. 5B shows the relative color gamut and the relative luminance ratio of the yellow primary color to the green primary color obtained from several experiments in the first embodiment.

FIG. 5B shows the relative color gamut and the ratio of the relative luminance of the yellow primary color to the green primary color according to several experimental results in the first embodiment. The little circle, hollow circle, cross, and hollow square represent the results of using the first backlight source, the second backlight source, the third backlight source, and the fourth backlight source in combination with different sets of four-primary color filters, respectively. The relative luminance ratio of the yellow primary color to the green primary color is taken at the peak position of the yellow primary color in the wavelength between 550 nm~600 nm. As shown in FIG. 5B, a wider color gamut is obtained when the ratio is greater than or equal to 0.5.

Figure 5C:
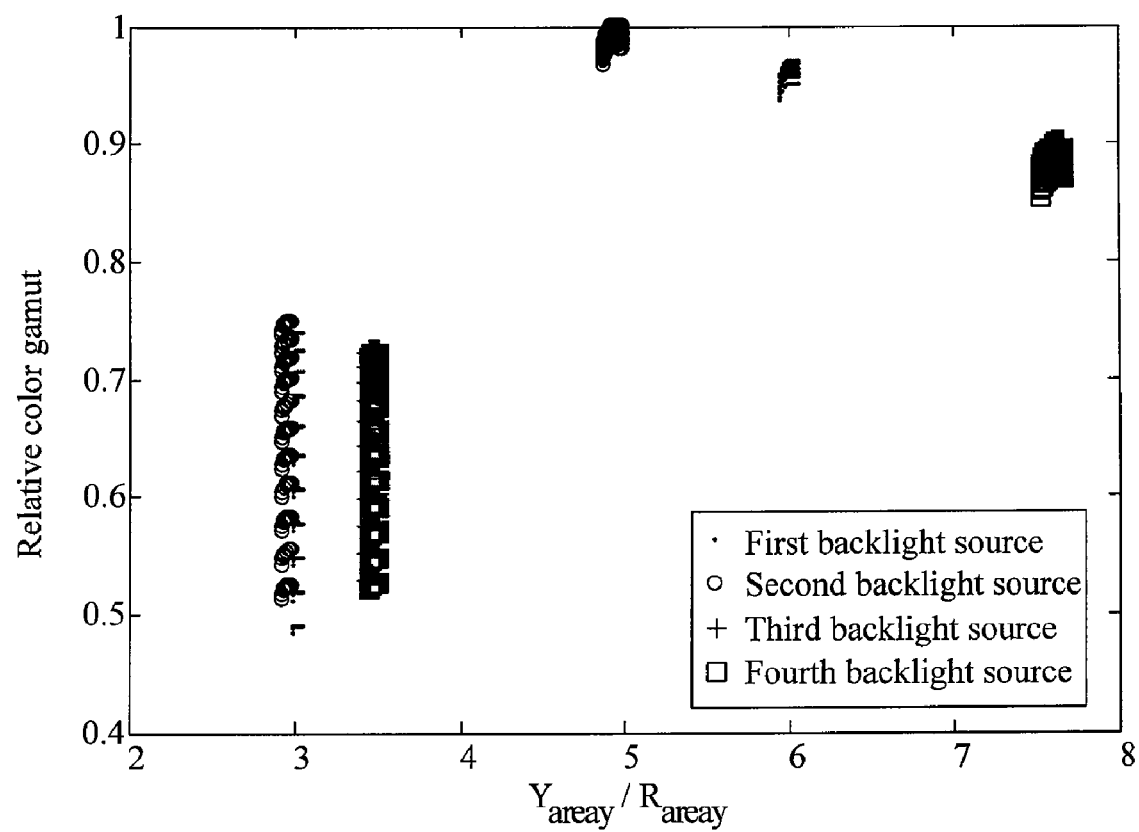
FIG. 5C shows the relative color gamut and the ratio of the total relative luminances of the yellow primary color and the red primary color obtained from several experiments in the first embodiment.

FIG. 5C shows the relative color gamut and the ratio of the ratio of the total relative luminances of the yellow primary color and the red primary color according to several experimental results in the first embodiment. The little circle, hollow circle, cross, and hollow square represent the results of using the first backlight source, the second backlight source, the third backlight source, and the fourth backlight source in combination with different sets of four-primary color filters, respectively. The ratio of the total relative luminances of the yellow primary color and the red primary color is taken in the wavelength between 550 nm~600 nm. As shown in FIG. 5C, a wider color gamut is obtained when the ratio of the total relative luminances is greater than or equal to 2.

Figure 5D:
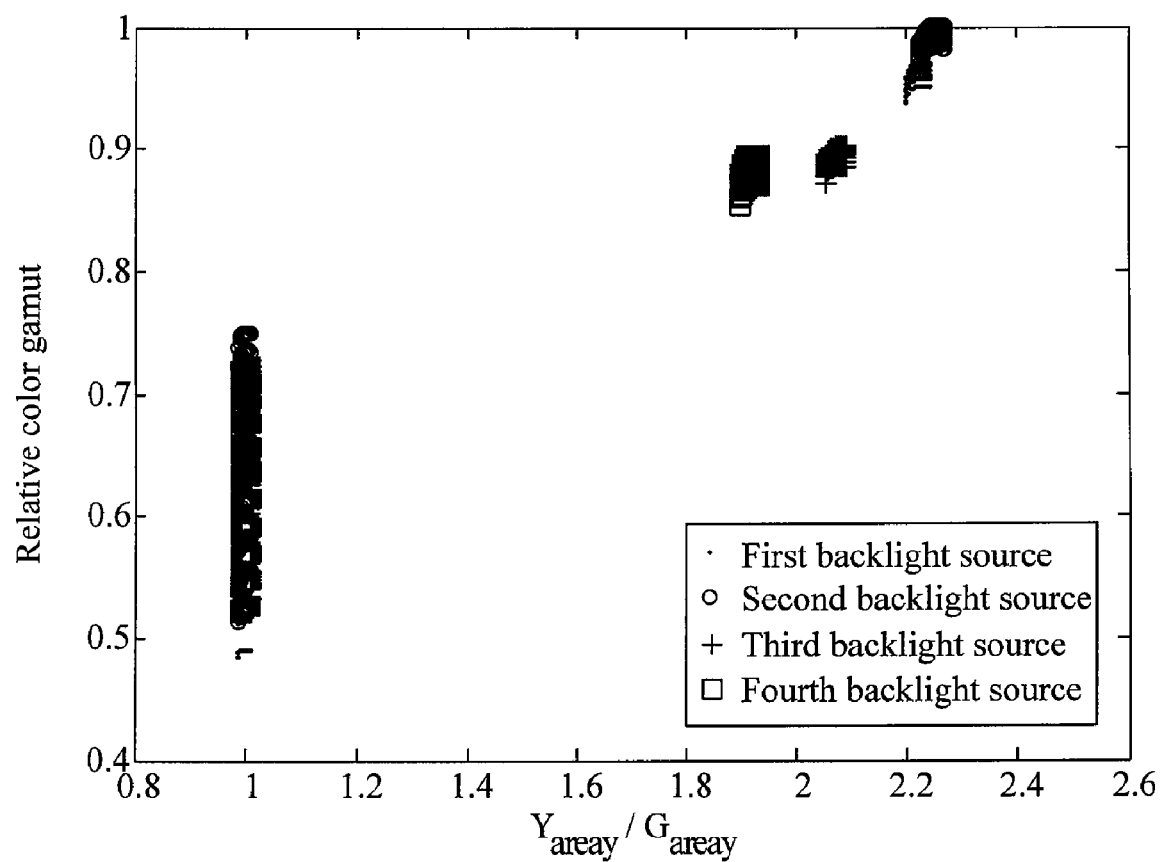
FIG. 5D shows the relative color gamut and the ratio of the total relative luminances of the yellow primary color and the green primary color obtained from several experiments in the first embodiment.

FIG. 5D shows the relative color gamut and the ratio of the ratio of the total relative luminances of the yellow primary color and the green primary color according to several experimental results in the first embodiment. The little circle, hollow circle, cross, and hollow square represent the results of using the first backlight source, the second backlight source, the third backlight source, and the fourth backlight source in combination with different sets of four-primary color filters, respectively. The ratio of the total relative luminances of the yellow primary color and the green primary color is taken in the wavelength between 550 nm~600 nm. As shown in FIG. 5D, a wider color gamut is obtained when the ratio of the total relative luminances is greater than or equal to 0.5.

TABLE 3

Relations of the relative luminance ratios and color gamut for FIGS. 5A-5D.

| $\dfrac{Y_{peak_Y}}{R_{peak_Y}}$ | Tendency | $\dfrac{Y_{peak_Y}}{G_{peak_Y}}$ | Tendency | $\dfrac{Y_{area_{550\sim600}}}{R_{area_{550\sim600}}}$ | Tendency | $\dfrac{Y_{area_{550\sim600}}}{G_{area_{550\sim600}}}$ | Tendency |
|---|---|---|---|---|---|---|---|
| 1.4859 |   | 0.99722 |   | 2.9895 |   | 1.0114 |   |
| 938.4043 | ↑ | 4.0694 | ↑ | 7.5361 | ↑ | 2.2268 | ↑ |

$\dfrac{Y_{peak_Y}}{R_{peak_Y}}$ : Ratio of the relative luminance of the yellow primary color to the red primary color (peak position in the wavelength of 550~600 nm);

$\dfrac{Y_{peak_Y}}{G_{peak_Y}}$ : Ratio of the relative luminance of the yellow primary color to the green primary color (peak position in the wavelength of 550~600 nm);

$\dfrac{Y_{area_{550\sim600}}}{R_{area_{550\sim600}}}$ : Ratio of the total relative luminances of the yellow primary color and the red primary color (in the wavelength of 550~600 nm);

$\dfrac{Y_{area_{550\sim600}}}{G_{area_{550\sim600}}}$ : Ratio of the total relative luminances of the yellow primary color and the green primary color (in the wavelength of 550~600 nm).

Table 3 shows the relationships of the ratios and the color gamut in FIGS. 5A-5D. The upper row gives the ratio in a smaller color gamut, and the lower row gives that in a larger color gamut. This clearly shows the change tendency in the ratio and the corresponding color gamut. In the wavelength range between 550 nm~600 nm, when the relative luminance of the red and green primary colors gets closer to the relative luminance of the yellow primary color, the color gamut thus formed is smaller. The ratios (area enclosed by the yellow primary color in the wavelength range of 550~600 nm)/(area enclosed by the red primary color in the wavelength range of 550~600 nm) and (area enclosed by the yellow primary color in the wavelength range of 550~600 nm)/(area enclosed by the green primary color in the wavelength range of 550~600 nm) are also smaller. That is, when the enclosed color gamut becomes larger, the spectrum of the yellow primary color remains almost the same while those of the red and green primary colors get lower.

To avoid the situation that colors beyond the color gamut of the three primary colors cannot be displayed even when the ratios are reached because the relative luminance of the primary colors is too small, the first embodiment also finds the required average relative luminance for the yellow primary color in the wavelength range between 550 nm~600 nm. When the maximum of the backlight emitted by the backlight source and the spectrum of the yellow primary color filter are both normalized to unity, the average relative luminance of the yellow primary color in the wavelength range between 550 nm~600 nm should be greater than or equal to 0.03 to avoid the above-mentioned situation.

Second Embodiment

Figure 6A:
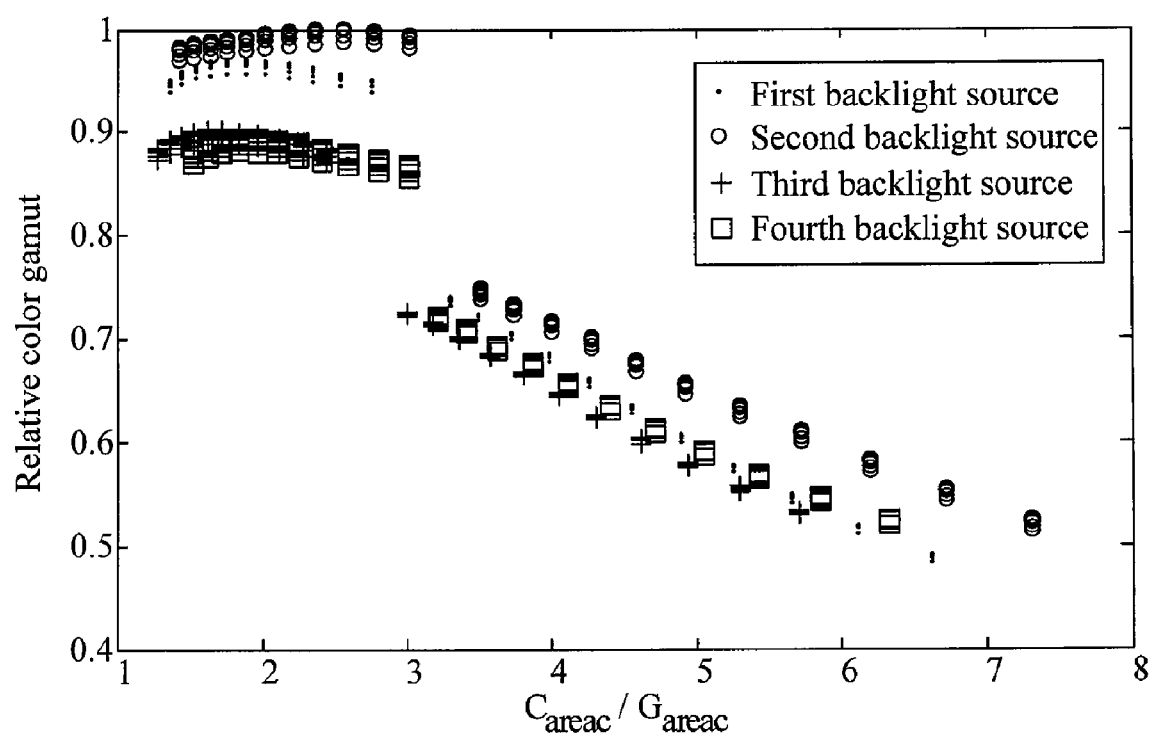
FIG. 6A shows the relative color gamut and the ratio of the total relative luminances of the cyan primary color and the green primary color obtained from several experiments in the first embodiment.

FIG. 6A shows the relative color gamut and the ratio of the total relative luminances of the cyan primary color and the green primary color obtained from several experiments according to the second embodiment of the invention. The little circle, hollow circle, cross, and hollow square represent the results of using the first backlight source, the second backlight source, the third backlight source, and the fourth backlight source in combination with different sets of four-primary color filters, respectively. The total relative luminance here takes the total relative luminance of the cyan primary color and the green primary color in the wavelength range between 450 nm~500 nm. FIG. 6A shows that a larger color gamut is obtained when the ratio of their total relative luminances is smaller than or equal to 1.

Figure 6B:
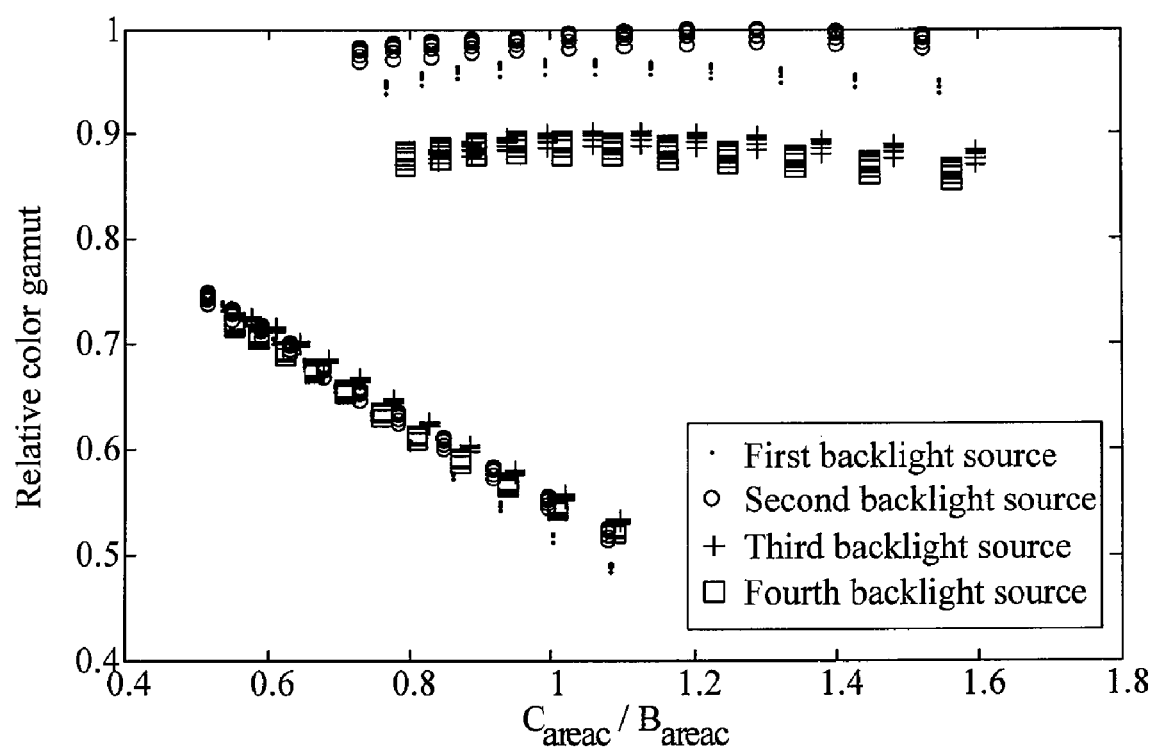
FIG. 6B shows the relative color gamut and the ratio of the total relative luminances of the cyan primary color and the blue primary color obtained from several experiments in the first embodiment.

FIG. 6B shows the relative color gamut and the ratio of the total relative luminances of the cyan primary color and the blue primary color obtained from several experiments according to the second embodiment of the invention. The little circle, hollow circle, cross, and hollow square represent the results of using the first backlight source, the second backlight source, the third backlight source, and the fourth backlight source in combination with different sets of four-primary color filters, respectively. The total relative luminance here takes the total relative luminance of the cyan primary color and the blue primary color in the wavelength range between 450 nm~500 nm. FIG. 6B shows that a larger color gamut is obtained when the ratio of their total relative luminances is smaller than or equal to 1.

TABLE 4

Relations of the relative luminance ratios and the color gamut in FIGS. 6A-6B.

| $\dfrac{C_{area_{450\sim500}}}{G_{area_{450\sim500}}}$ | Tendency | $\dfrac{C_{area_{450\sim500}}}{B_{area_{450\sim500}}}$ | Tendency |
|---|---|---|---|
| 7.3217 |   | 1.0956 |   |
| 1.5293 | ↑ | 0.83304 | ↑ |

$\dfrac{C_{area_{450\sim500}}}{G_{area_{450\sim500}}}$ : Ratio of the total relative luminances of the cyan primary color and the green primary color (in the wavelength range of (450~500 nm);

$\dfrac{C_{area_{450\sim500}}}{B_{area_{450\sim500}}}$ : Ratio of the total relative luminances of the cyan primary color and the blue primary color (in the wavelength range of (450~500 nm).

Table 4 lists the relationships of the relative luminance ratios and the color gamut in FIGS. 6A-6B. The upper row gives the ratio in a smaller color gamut, and the lower row gives that in a larger color gamut. This clearly shows the change tendency in the ratio and the corresponding color gamut. In the wavelength range between 450 nm~500 nm, when the relative luminance of the cyan gets closer to the relative luminance of the blue primary color, the color gamut thus formed is smaller. In this case, the ratios (area enclosed by the cyan primary color in the wavelength range of 450~500 nm)/(area enclosed by the blue primary color in the wavelength range of 450~500 nm) and (area enclosed by the cyan primary color in the wavelength range of 450~500 nm)/(area enclosed by the green primary color in the wavelength range of 450~500 nm) are greater. That is, when the enclosed color gamut becomes larger, the spectra of the blue and green primary colors remain almost the same while that of the cyan primary color get lower.

To avoid the situation that colors beyond the color gamut of the three primary colors cannot be displayed even when the ratios are reached because the relative luminance of the primary colors is too small, the second embodiment also finds the required average relative luminance for the cyan primary color in the wavelength range between 450 nm~500 nm. When the maximum of the backlight emitted by the backlight source and the spectrum of the cyan primary color filter are both normalized to unity, the average relative luminance of the cyan primary color in the wavelength range between 450 nm~500 nm should be smaller than or equal to 10 to avoid the above-mentioned situation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display device, comprising:
   a backlight source; and
   a plurality of pixels, each of which has at least four sub pixels including red primary color, green primary color, blue primary color, and a fourth primary color;
   wherein the relative luminance ratio of the fourth primary color to the red primary color is greater than or equal to 1 at the peak position of the fourth primary color located in the wavelength range between 550 nm~600 nm.

2. The display device of claim 1, wherein the fourth primary color is yellow primary color.

3. A display device, comprising:
   a backlight source; and
   a plurality of pixels, each of which has at least four sub pixels including red primary color, green primary color, blue primary color, and a fourth primary color;
   wherein the relative luminance ratio of the fourth primary color to the green primary color is greater than or equal to 0.5 at the peak position of the fourth primary color located in the wavelength range between 550 nm~600 nm.

4. The display device of claim 3, wherein the fourth primary color is yellow primary color.

5. A display device, comprising:
   a backlight source; and
   a plurality of pixels, each of which has at least four sub pixels including red primary color, green primary color, blue primary color, and a fourth primary color;
   wherein the ratio of the total relative luminances of the fourth primary color and the red primary color is greater than or equal to 2 in the wavelength range between 550 nm~600 nm.

6. The display device of claim 5, wherein the fourth primary color is yellow primary color.

7. A display device, comprising:
   a backlight source; and
   a plurality of pixels, each of which has at least four sub pixels including red primary color, green primary color, blue primary color, and a fourth primary color;
   wherein the ratio of the total relative luminances of the fourth primary color and the green primary color is greater than or equal to 0.5 in the wavelength range between 550 nm~600 nm.

8. The display device of claim 7, wherein the fourth primary color is yellow primary color.

9. A display device, comprising:
   a backlight source; and
   a plurality of pixels, each of which has at least four sub pixels including red primary color, green primary color, blue primary color, and a fourth primary color;
   wherein the average relative luminance of the fourth primary color is greater than or equal to 0.03 in the wavelength range between 550 nm~600 nm when the maximum of the backlight emitted by the backlight source and filters of the sub pixels of the fourth primary color are both normalized to unity.

10. The display device of claim 9, wherein the fourth primary color is yellow primary color.

11. A display device, comprising:
    a backlight source; and
    a plurality of pixels, each of which has at least four sub pixels including red primary color, green primary color, blue primary color, and a fourth primary color;
    wherein the ratio of the total relative luminances of the fourth primary color and the green primary color is smaller than or equal to 10 in the wavelength range between 450 nm~500 nm.

12. The display device of claim 11, wherein the fourth primary color is cyan primary color.

13. A display device, comprising:
    a backlight source; and
    a plurality of pixels, each of which has at least four sub pixels including red primary color, green primary color, blue primary color, and a fourth primary color;
    wherein the ratio of the total relative luminances of the fourth primary color and the blue primary color is smaller than or equal to 10 in the wavelength range between 450 nm~500 nm.

14. The display device of claim 13, wherein the fourth primary color is cyan primary color.

15. A display device, comprising:
    a backlight source; and
    a plurality of pixels, each of which has at least four sub pixels including red primary color, green primary color, blue primary color, and a fourth primary color;
    wherein the average relative luminance of the fourth primary color is smaller than or equal to 10 in the wavelength range between 450 nm~500 nm when the maximum of the backlight emitted by the backlight source and filters of the sub pixels of the fourth primary color are both normalized to unity.

16. The display device of claim 15, wherein the fourth primary color is cyan primary color.

* * * * *